G. H. PERKINS
Combined Clamp and Soldering Apparatus.
No. 206,194    Patented July 23, 1878.
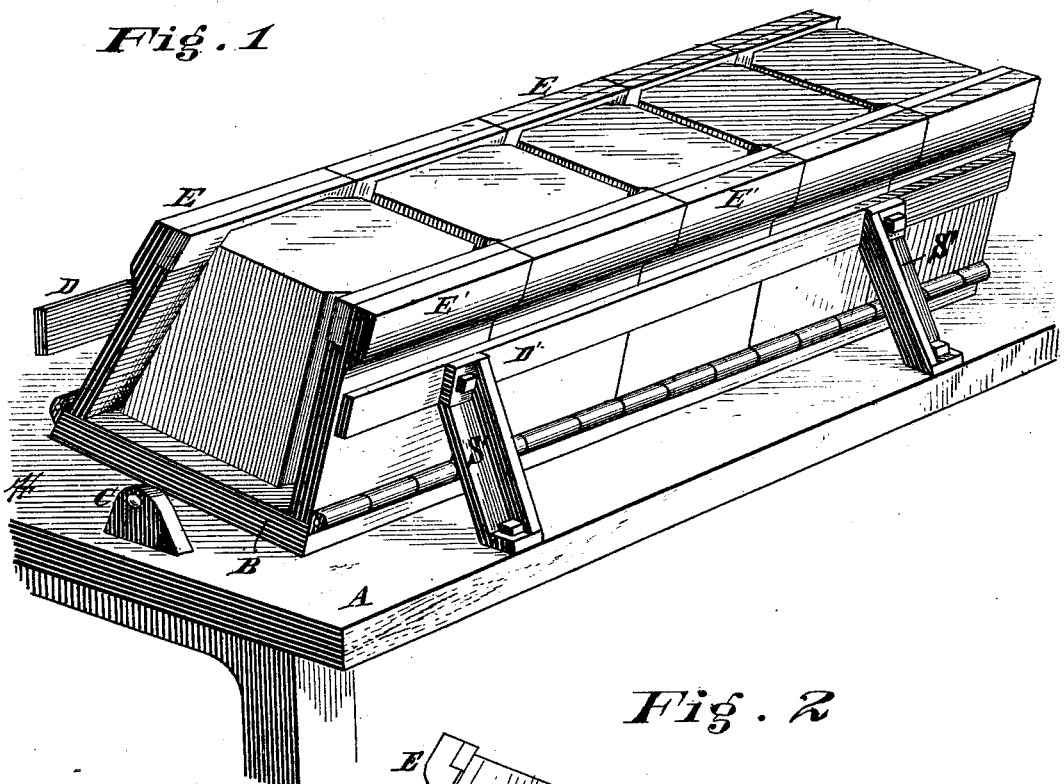
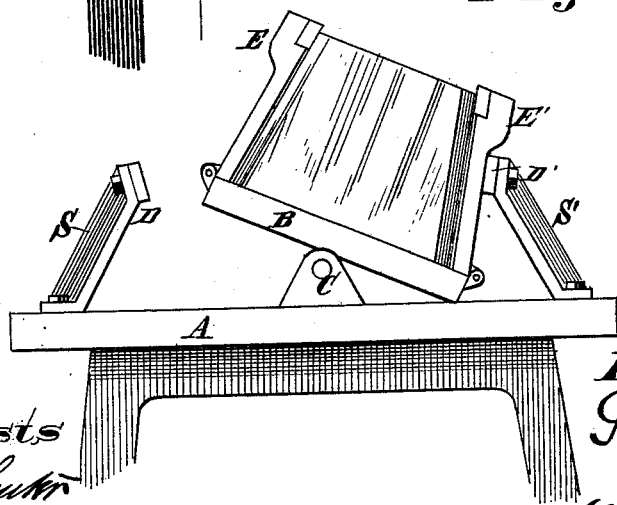

UNITED STATES PATENT OFFICE.

GEORGE H. PERKINS, OF PHILADELPHIA, PENNSYLVANIA.

IMPROVEMENT IN COMBINED CLAMP AND SOLDERING APPARATUS.

Specification forming part of Letters Patent No. 206,194, dated July 23, 1878; application filed June 7, 1878.

CASE B.

*To all whom it may concern:*

Be it known that I, GEORGE H. PERKINS, of the city and county of Philadelphia, in the State of Pennsylvania, have invented a new and useful Improvement in Combined Clamp and Soldering Apparatus for Metal Cans, of which the following is a full, clear, and exact description.

My invention relates in general to the class of devices which are employed in soldering the heads, or tops and bottoms, upon metallic cans, and is more especially designed for use with square, rectangular, or truncated-cone cans, but is applicable by adaptation to cans of other shapes. It relates more specifically to a similar invention, for which I have made application for Letters Patent as Division A of the present application, to which reference is to be made.

It consists in the apparatus hereinafter described and claimed.

Of the drawings, Figure 1 is a view, in perspective, of a device embodying my invention; and Fig. 2, an end view of the same.

Similar letters of reference indicate corresponding parts.

In Division A of the present application I have represented and described a combined clamp and soldering apparatus, embracing the three functions of clamp for the can-heads and the bodies, guide for the soldering-iron, and mold for the solder, in which apparatus the sides are hinged to the rocking base and clamped together against the cans by means of locks or similar devices.

In the present modified form of my apparatus both sides are hinged to the rocking base, and are made of heavy material or loaded at their upper portion, while the table upon which the apparatus rests is provided with standards or supports S D, which uphold the side which is tilted down, while the other side, or the one which inclines over against the can, is held in position against it by its own weight. In other respects the two devices are similar.

In the drawings, A represents the table, upon which is hinged the base B, which rocks upon the longitudinal pivot C. S D S' D' are the standards; E E', the weighted clamp-sides.

When the apparatus is designed for a series of cans the clamp-sides may be made in series, each being separately hinged to the base, in which case the elastic adjustment of the slate soldering-faces may be dispensed with. When, however, the sides are made in a continuous piece of the length of the base, the above-mentioned adjustment is to be retained.

The apparatus is operated by being first tilted to one side and then to the other, the clamp-side which is down in each case being braced up against the can-body by the support upon that side, and the other clamp-side being maintained against the can by its own weight, which action the inclination given to such side enables. The apparatus so constructed may, of course, be applied by adaptation to the soldering of a single can.

Having thus described my invention, I claim and desire to secure by Letters Patent of the United States—

A combined clamp and soldering apparatus for metal cans, consisting of a rocking base upon which one or more cans are set, clamp-sides hinged to the base, and standards on both sides of the apparatus, in such position relatively to the apparatus as to uphold against the can the clamp-side toward which the apparatus is tilted, the other clamp-side being retained by its own weight and inclination against the can, substantially as shown and described.

In testimony whereof I have hereunto signed my name this 28th day of May, 1878.

GEORGE H. PERKINS.

In presence of—
  J. BONSALL TAYLOR,
  WM. C. STRAWBRIDGE.